United States Patent

[11] 3,607,106

| [72] | Inventor | Hartmut Rainier Hetzel<br>Eichenweg 7, 4047 Dormagen-Horrem, Germany |
|---|---|---|
| [21] | Appl. No. | 848,137 |
| [22] | Filed | July 28, 1969 |
| [45] | Patented | Sept. 21, 1971 |
| [32] | Priority | Aug. 29, 1968 |
| [33] | | Germany |
| [31] | | P 17 92 404.8 |

[54] APPARATUS FOR CARRYING OUT CONTINUOUS PROCESS HAVING A FIXED PROCESS DURATION WITH INDIVIDUAL REACTANTS AS WELL AS HOMOGENOUS CONCENTRATION CHANGE OF THE REACTION MASS
4 Claims, 2 Drawing Figs.

[52] U.S. Cl. .................................................. 23/269,
23/286, 23/1, 23/288 E, 134/121, 259/58, 259/3, 259/51
[51] Int. Cl. ........................................................ C01f 110/2
[50] Field of Search............................................ 23/269, 288.3, 288, 1, 272.5, 286, 259, 259/57, 58, 14–16, 3, 84, 85; 134/121, 80, 81

[56] References Cited
UNITED STATES PATENTS

| 2,347,829 | 5/1944 | Karlsson et al. .............. | 23/288.3 |
|---|---|---|---|
| 2,706,532 | 4/1955 | Ringo et al................... | 23/288.3 |

*Primary Examiner*—Norman Yudkoff
*Assistant Examiner*—S. Silverberg
*Attorney*—Cushman, Darby & Cushman ABSTRACT: An apparatus is provided for carrying out a reaction process of fixed duration which also requires a homogeneous concentration change of the reaction mass. The apparatus includes a rotatably mounted, vertical, cylindrical container separated into a plurality of cells by radial walls. Stirring means are provided in each cell. Fixed supply means are mounted over the container for continuously supplying reactants during a portion of the rotation to the individual cells. Each cell has an outlet for emptying its contents when reaction is complete.

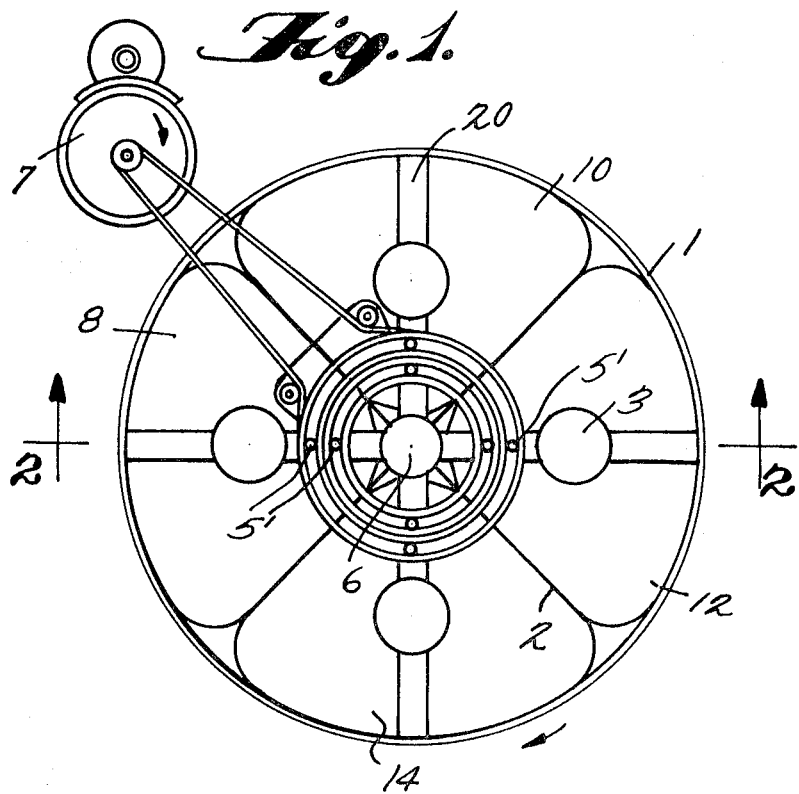
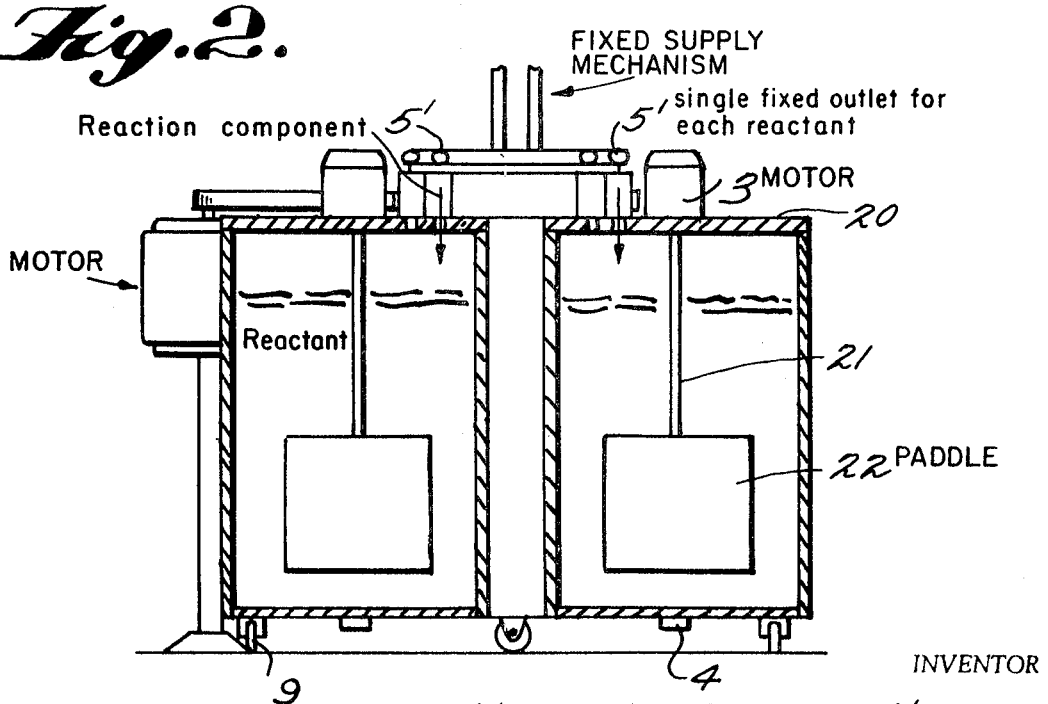

APPARATUS FOR CARRYING OUT CONTINUOUS PROCESS HAVING A FIXED PROCESS DURATION WITH INDIVIDUAL REACTANTS AS WELL AS HOMOGENOUS CONCENTRATION CHANGE OF THE REACTION MASS

Many batch processes are carried out so that the reactants are dosed with one or more reaction components while stirring during an exactly fixed time. Such processes include for example a. precipitation of silicic acid (by addition of sulfuric acid or carbon dioxide to a water glass solution during 1 to 2 hours, b. pigment production, for example, chrome yellow (by addition of potassium dichromate to lead acetate during 1.5 hours), c. diazotization (by addition of hydrochloric acid and sodium nitrite to an aniline solution during 0.5 hour), d. DDT production (by the addition of sulfuric acid to a mixture of chloral, chlorobenzene and sulfuric acid during 4 hours).

In the above-named processes, it is important that among other things, one or more of the following three conditions be observed exactly.

1. The duration of the process is exactly fixed for all reactants.
2. The change in concentration of the reaction mass takes place homogeneously.
3. The reaction mass is continually well mixed.

It is known to carry out continuous processes in plants which operate corresponding to a cascading or flowing tube (Blenke, Bohner, Schuster in Chemie-Ingenieur-Technik 37, 289–294 (1965)). In such arrangements there results, however, an unregulated process duration of the individual reactants as well as an unhomogeneous concentration change and, in the case of flowing tubes, insufficient mixing of the reaction mass.

There has already been proposed an apparatus in which the invention is based on solving the problem in which the applied reactants are distributed through a transport screw in individual closed cells which are furnished with supply mechanisms for the remaining reaction components through the turning of the transport screw whereby a thorough mixing is provided by stirring contrivances installed inside the screw threads.

An apparatus of this type is suitable for all kinds of cell processes, particularly for those which must be run under superatmospheric pressure. For pressure-free processes (i.e. processes at atmospheric pressure), it is possible to produce an apparatus which is more simply arranged and therefore is cheaper. Besides it provides an easy accessibility to all mechanisms so that these can be taken care of very easily.

The especial characteristic of the apparatus of the present invention is in the use of a rotatably arranged, vertical, cylindrical container which is divided into single cells by radial walls, each of which possesses a stirring mechanism as well as a, preferably magnetically operated, outlet valve. The container turns around its own axis with a constant number of revolutions whereby through fixed supply mechanisms arranged over the container the individual cells continuously are supplied with reaction components and the cells are emptied successively through openings in the outlet valves as the container sweeps over a fixed angle of the circle of rotation.

The invention will be understood best in connection with the drawings where

FIG. 1 is a top view of the apparatus; and
FIG. 2 is a sectional view along the line 2—2 of FIG. 1.

Referring more specifically to the drawings, the apparatus of the invention consists of a rotatably arranged, vertical, cylindrical container 1 which is separated into individual cells by radial walls 2 thus each cell is open at the top portion. Each cell contains a motor 3, shaft 21, and paddle 22 which acts as a stirring mechanism for the reaction components within the cell as well as a, for example, magnetically operated outlet valve 4. Over the container are fixed (i.e. immovable) supply mechanisms 5 for the different reaction components necessary to put into the process. The supply mechanisms 5 are so arranged as is shown in FIG. 1 that the supply mechanisms can supply reaction components to only one cell at a time. In other words, the outlets 5' for the reaction products are angularly spaced with respect to one another as shown in FIG. 1 around the fixed supply mechanism 5 such that they can only supply reaction components to the open top of one cell at a time. The motors 3 are each mounted on a separate brace 20 arranged with holes 24 to register with the outlets 5' of the supply mechanisms 5 so that when the braces 20 pass under the ends of the supply mechanisms 5' the components from mechanisms 5' may pass through the holes 24 to the cells 8–14. During the other portions of angular rotation reaction products pass directly from the ends 5' of supply mechanisms 5 to cells 8–14 since the tops of these cells are open to the supply mechanisms. It is further to be noted as shown in FIG. 2 that there is no point of contact between supply mechanisms 5 which are fixed and rotating container 1. The container is rotated about its axis 6 with the aid of motor 7 and wheels 9. During a rotation of the cylindrical container, it moves with the cells designated 8, 10, 12 and 14 under these supply mechanisms. In the drawings only cell 8 was filled with a preadditive while the reaction components were added in cells 10 and 12. Cell 14 in the condition shown in the drawings was emptied by opening the outlet valve.

With this apparatus it is also possible in a very simple manner to so run a discontinuous process that by continuous reaction likewise continuously accumulates the supply of reaction product.

Should the process be run at elevated temperatures (for example 50° to 90° C.), it is recommended that preadditives and reactants be brought into the bucket reactor in the heated condition. In order to maintain the temperature, the reactor can be provided with insulation. As an example of the method of the operation of the bucket wheel reactor, the following process is given.

All parts and percentages are by weight unless otherwise indicated.

EXAMPLE

In a water receiver at a temperature of 70° C. a finely divided silicia acid was precipitated by simultaneous addition of water glass solution (35% solids, $Na_2O:SiO_2$ mol ratio of 1 to 3.3) and sulfuric acid (36% solids) in the ratio of 10 vol.-parts water glass solution to 1 vol.-part of sulfuric acid. The addition of the reaction solutions takes 30 minutes; about 480 m.³ of product containing 28 tons silicid acid is produced. For this purpose there was used a four celled bucket wheel reactor whose individual cell volumes amounted to 5 m.³, with a rotational velocity of 1 revolution per hour. In cell 1 there flowed in during one-fourth rotation of the bucket wheel reactor (15 minutes) about 4 m.³ of preheated (70° C.) water. During the further rotation both reactants were added in a half hour to the water preadditive whereby the liquid volume was increased to about 5 m.³. After this, the reaction was stopped and the precipitated silicid acid drawn off during the following one-quarter hour by opening the bottom valve. The emptied cell was again filled after closing the bottom valve and the process begun again. In each one-quarter hour there precipitated 5 m.³ of silicid acid which corresponds to a production of 480 m.³ in 24 hours.

The individual cells will normally be of the same size.

What is claimed is:

1. An apparatus for continuously carrying out a batch process in which one or more reaction components are added to a reactant and stirred into said reactant for a fixed time so as to become homogeneously mixed therewith comprising a rotatably mounted, vertical, cylindrical container, said container being separated through a plurality of radial walls into a plurality of cells having open tops, mechanical agitating means disposed within each of said cells, means for powering said mechanical agitating means, means for rotating said container at a constant speed around its own axis, fixed supply means mounted above said container and communicating with the area above said cells for supplying reactants and reaction components to each of said cells in turn when said container is rotated with respect to said fixed supply means, outlet means disposed at the bottom of each cell and means for opening said outlet means to empty each cell after a predetermined angle of the cell circle of rotation has been completed.

2. An apparatus according to claim 1 wherein said outlet means comprises a magnetically operated valve.

3. An apparatus claim according to claim 1 wherein said cells all are of an identical size.

4. A process for continuously carrying out a batch process in which one or more reaction products are added to a reactant and stirred into said reactants for a fixed time so as to become homogeneously mixed therewith comprising the steps of a. feeding reactants under atmospheric pressure from a fixed supply means to one cell of a multicelled, vertical, cylindrical rotatable container, b. rotating the container at a constant speed around its own axis parallel to said fixed supply means, continuously supplying one or more subsequent reaction components at atmospheric pressure from said fixed supply means so that said cells are supplied only during that portion of the time the container is being rotated that the individual cells are beneath said fixed supply means, c. continuously stirring the reaction mixture with a mechanical agitator disposed within each cell throughout the reaction, and d. emptying the individual cells in turn after completion of the addition of the reactants and the thorough mixing thereof.